June 30, 1936.  W. W. GARDNER  2,045,641

GAS METER

Filed Jan. 10, 1934  3 Sheets-Sheet 1

Inventor
Willis W. Gardner
by Seymour Earle & Nichols
Attys

June 30, 1936.  W. W. GARDNER  2,045,641
GAS METER
Filed Jan. 10, 1934  3 Sheets-Sheet 2
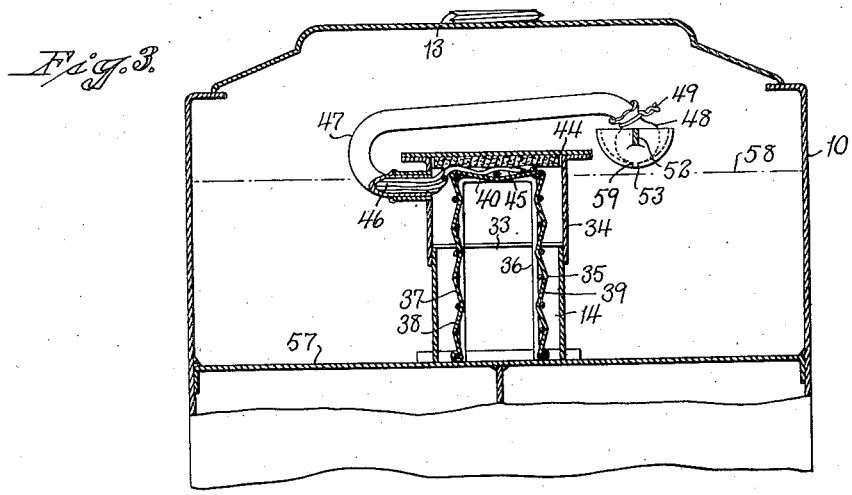
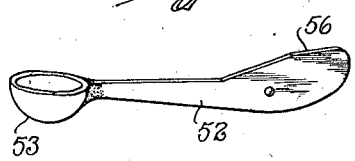
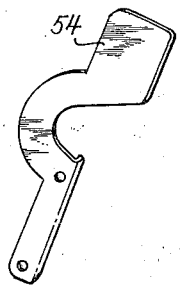
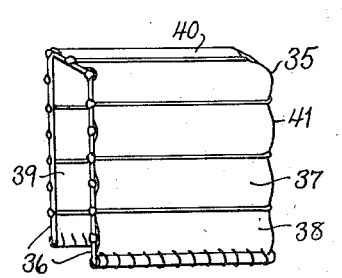
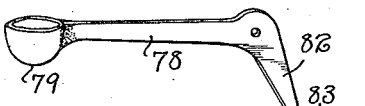

June 30, 1936.  W. W. GARDNER  2,045,641
GAS METER
Filed Jan. 10, 1934  3 Sheets-Sheet 3

Patented June 30, 1936

2,045,641

UNITED STATES PATENT OFFICE 2,045,641

GAS METER

Willis W. Gardner, Meriden, Conn.

Application January 10, 1934, Serial No. 705,993

5 Claims. (Cl. 73—262)

This invention relates to improvements in gas meters, and more particularly to providing lubrication for parts of gas meters.

One object of this invention is to provide an improved construction whereby parts of gas meters will be supplied with lubrication in proportion to the amount of gas passing through the meter.

Another object of this invention is to provide an improved construction for lubricating parts of gas meters, whereby when gas ceases to pass through the meter, the supply of lubricant to the parts is discontinued until gas again starts passing through the meter.

With the above and other objects in view, this invention includes the improved features, parts and combinations of parts disclosed in the following description, appended claims and accompanying drawings forming a part of the specification.

In the accompanying drawings, in which certain ways of carrying out the invention are shown for illustrative purposes:

Fig. 3 is a sectional view on line 3—3 of Fig. 2;

Fig. 4 is a perspective view of a member for actuating the pivotally-mounted lubricant-holding supply-member;

Fig. 5 is a perspective view of the lubricant-holding supply-member;

Fig. 6 is a perspective view of the absorbent-means for containing lubricant to impregnate the gas therewith;

Fig. 9 is a perspective view of a modified form of lubricant-holding supply-member, shown also in Figs. 7 and 8.

Figure 1:
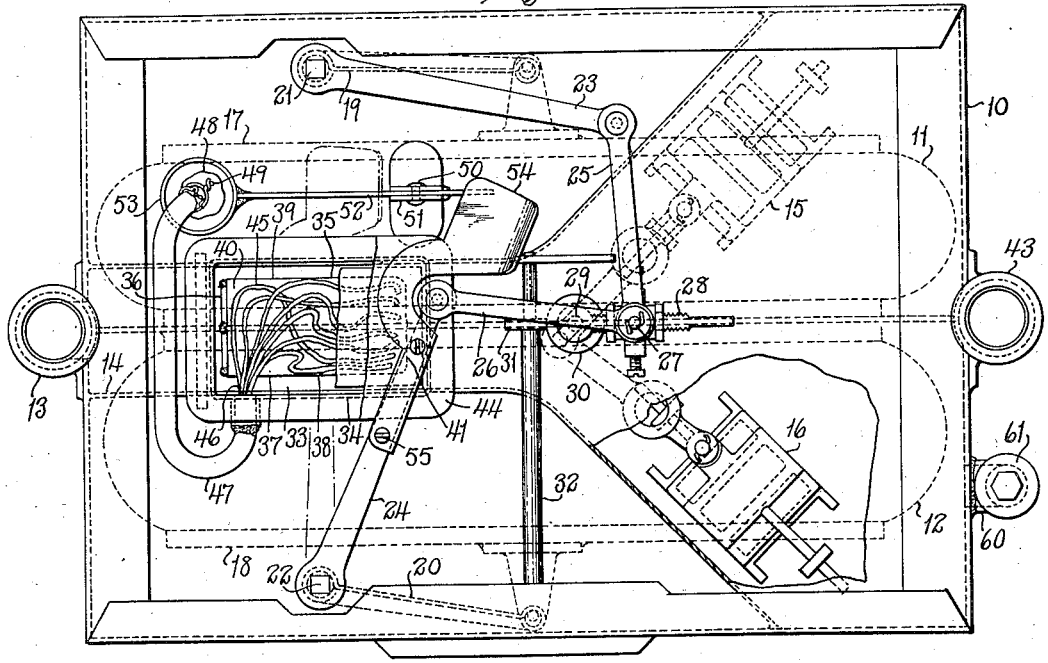
Fig. 1 is a plan view illustrating a standard form of gas meter with applicant's invention applied thereto.

Gas meters of the usual type, to which this invention is primarily intended to be applied, have flexible leather diaphragms which are initially treated with oil or other suitable softening material, to insure proper, easy flexing action of the diaphragm during the gas-measuring operation. In the course of time, as the gas passes through the meter, it absorbs the lubricant from the diaphragm, with the consequent tendency of the leather diaphragm to become stiff and porous, the stiffness tending to interfere with easy action of the movement of the diaphragm, and the porosity resulting in gas leaking through the diaphragm, with consequent further inaccuracy in the meter. Moreover, finally, when the drying action has proceeded to a sufficient degree, there is tendency for the leather to become so hard as to crack and be destroyed. To overcome this difficulty, numerous efforts have been made to supply lubricant to the leather diaphragm at suitable intervals and in suitable amount to maintain the diaphragm in its best working condition.

Another thing tending to interfere with the permanent efficient operation of the meter is the tendency of thick, viscous, varnish-like deposits to form upon the relatively-moving valve-surfaces of the valves of the meter, thereby interfering with the smooth, easy operation of the valves and further tending to bring about inaccuracy of the meter.

In accordance with my invention, I apply suitable liquid, for convenience termed "lubricant", to parts of the gas meter. The lubricant which I employ preferably has the qualities of retaining the leather in satisfactory, flexible, non-porous condition, of lubricating the relatively-moving valve-surfaces, and also eliminating the tendency to formation of the gummy deposits thereon. While I do not intend to limit myself to the use of any particular lubricant, tetralin, otherwise known as tetra-hydro-naphthalene, performs the foregoing leather-softening lubricating and gum-eliminating actions in a satisfactory degree and, therefore, is eminently suited for use in connection with my invention.

Referring to Figs. 1 to 6 of the drawings, 10 is a gas meter of usual construction so far as its gas-measuring characteristics are concerned, which form of construction of gas meter is thoroughly standard in the art, and is more fully shown in many of the patents in the art. The gas meter 10 has gas-measuring means including flexible diaphragms 11 and 12, usually of leather, which are mounted in gas-measuring chambers to operate in the usual and well-known manner. Gas to be measured enters the inlet-pipe 13 and passes along the inlet 14 until it reaches the slide-valves 15 and 16, which control the passage of the gas to the measuring-chambers in the well-known manner.

The disks 17 and 18 are connected respectively to flexible diaphragms 11 and 12 as they reciprocate in opposite directions, to cause the arms 19 and 20 to oscillate the pivoted rods 21 and 22. Connected to the upper ends of the rods 21 and 22 are arms 23 and 24 adapted to oscillate in a horizontal plane and rotate the shaft 29 through links 25 and 26 which are pivoted at 27 to an arm 28, which latter is secured to the upper end of the vertically-pivoted shaft 29. The shaft 29 has secured thereto a worm 30 which meshes with and drives a worm-wheel 31 secured on the shaft 32 which drives the index-wheels (not shown) of the meter. The lower end of the vertical shaft 29 has suitable connections with the slide-valves 15 and 16 for driving these valves, all in the usual and well-known manner.

I modify the usual form of inlet or inlet-passage 14 by providing an opening 33 in the upper portion thereof, and attach above the said opening, by solder or other suitable means, an extension-frame 34 to provide a chamber of suitable height to hold an amply large absorbent-member 35 which in the form of the invention shown in the drawings has a wire-frame 36 supporting a porous fabric 37 adapted to act as an absorbent medium to hold lubricant. The fabric 37, it will be observed, covers the large sides 38 and 39, the top 40 and the rear 41, thus causing the gas, as it passes through the inlet 14 in the direction indicated by the arrow 42, to surge around, over and through the fabric 37, with the result that the gas absorbs or becomes impregnated by the lubricant which is in the absorbent fabric 37, whereupon the gas impregnated with lubricant passes onward and downward through the valves 15 and 16, to be measured, whereupon it passes out the outlet 43. The top of the extension-frame 34 is sealed with a cover-plate 44 which is soldered or otherwise secured thereto.

Figure 2:
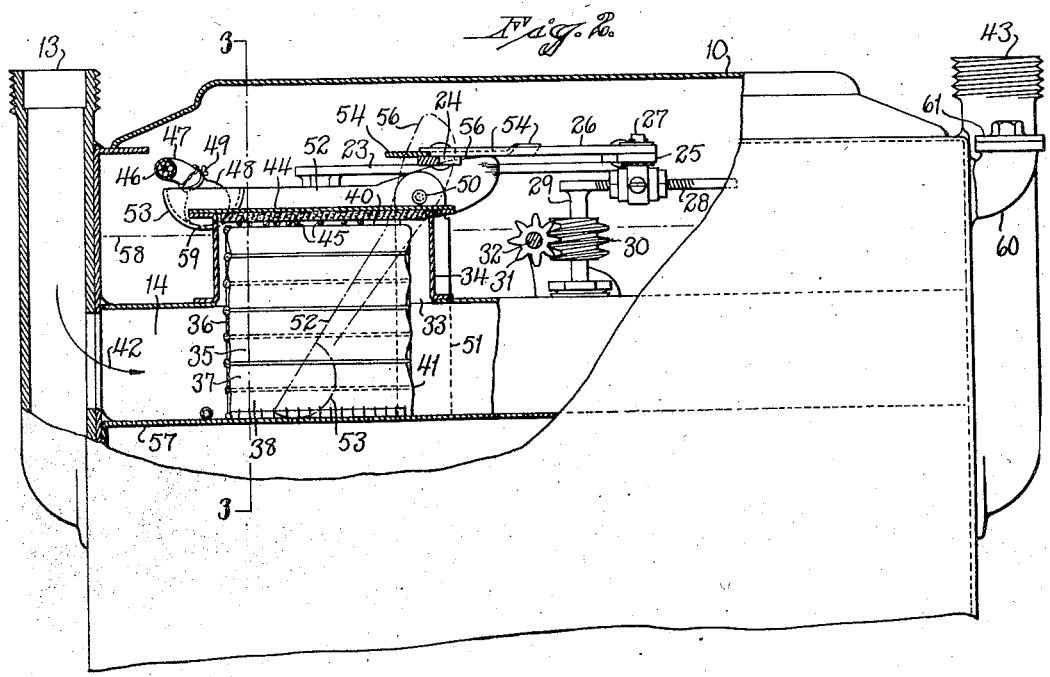
Fig. 2 is a front elevation, partly in section, of the construction shown in Fig. 1.

In order to supply lubricant to the absorbent fabric 37, ends 45 of a plurality of wick-members forming a wick 46 are laid on top of and in contact with the absorbent fabric 37, from which position they extend into a tube 47 which is soldered or otherwise secured in position to extend through the wall of the extension-frame 34, whereupon the tube 47 extends across to the other side of the extension-frame 34 to the position shown in Figs. 1 and 2, where it has the end of the wick 46 extended out the end of the tube 47 and enclosed within a piece of porous fabric 48 attached to the end of the tube 47 by wire 49 or the like.

Pivoted at 50 on a supporting-bracket 51 is a lubricant-holding supply-arm 52, carrying a cup 53 at one end which is adapted to rise up to a position as shown in Fig. 2, surrounding the porous member 48.

A cam-plate 54 is secured to the arm 24 by means of screws 55 or otherwise, in position to travel back and forth in a horizontal plane with the arm 24 and wipe along the cam-edge 56 of the arm 52 to alternately swing the cup up to the horizontal position shown in Fig. 2 and let it drop to the broken-line position shown in the same figure, during the operation of the gas meter. The excess lubricant is free to drop off the exposed end of the wick when the cup swings down.

The upper portion of the gas meter above the horizontal dividing-plate 57 is preferably filled with lubricant up to about the level indicated by the broken line 58 (Fig. 2). Inasmuch as the glass covering the index-reading portion (not shown) in the standard meter occupies a height range which is substantially co-incident with the position of the body of lubricant, the level of lubricant in the meter will at all times be evident incidental to the operation of reading the meter, and inasmuch as the lubricant in the small thickness in which it occurs between the glass and the dial-members to be read is substantially transparent, it will not interfere with reading of the meter.

The cup 53 may be provided with a small hole 59 in the bottom thereof which, while not substantially interfering with raising a small amount of lubricant in position to apply it to the porous fabric 48 will, in the event that the meter should stop operation while the arm 52 is in its upper horizontal position, permit excess lubricant to drain out through the hole 59. It will thus be evident that lubricant will be supplied to the fabric 48, wick 46 and absorbent fabric 37, only in proportion to the amount of gas passing through the meter and during a period of time which is substantially only co-incident with the passage of gas through the meter.

In other words, if a small amount of gas passes through the meter, thereby causing the mechanism of the meter to be actuated slowly, then the up-and-down movement of the arm 52 is slow, thereby bringing a supply of lubricant to the wick 46 only at comparatively-long intervals, whereas, when a large volume of gas passes through the meter, it actuates the mechanism more rapidly, with consequent increase in speed of oscillation of the arm 52, and, therefore, more frequent applying of lubricant to the wick, with a consequent increased supply to the absorbent fabric 37.

As the gas passes along the inlet 14 and surges through and around the absorbent fabric 37, it absorbs or becomes impregnated with some of the lubricant and carries this along, with a tendency to permit some of this lubricant to condense or deposit upon such surfaces as the gas comes in contact with. Under this circumstance, the lubricant will tend to condense along the relatively-moving surfaces of the valves 15 and 16, with the result that the surfaces will be properly lubricated and kept free from gummy deposits which would otherwise interfere with their best action.

As the gas passes onward into the lower chamber where it comes in contact with the flexible leather diaphragms 11 and 12, there will be a tendency for a certain amount of lubricant to be deposited upon the diaphragms, rather than to absorb out of the diaphragms such lubricant as is in them, thereby permitting the diaphragms to remain in their original flexible, non-porous condition in which they give maximum efficiency of operation. Any suitable means such, for example, as the elbow-coupling 60, having a removable cover 61, may be provided for the purpose of introducing lubricant into the meter.

Figure 7:
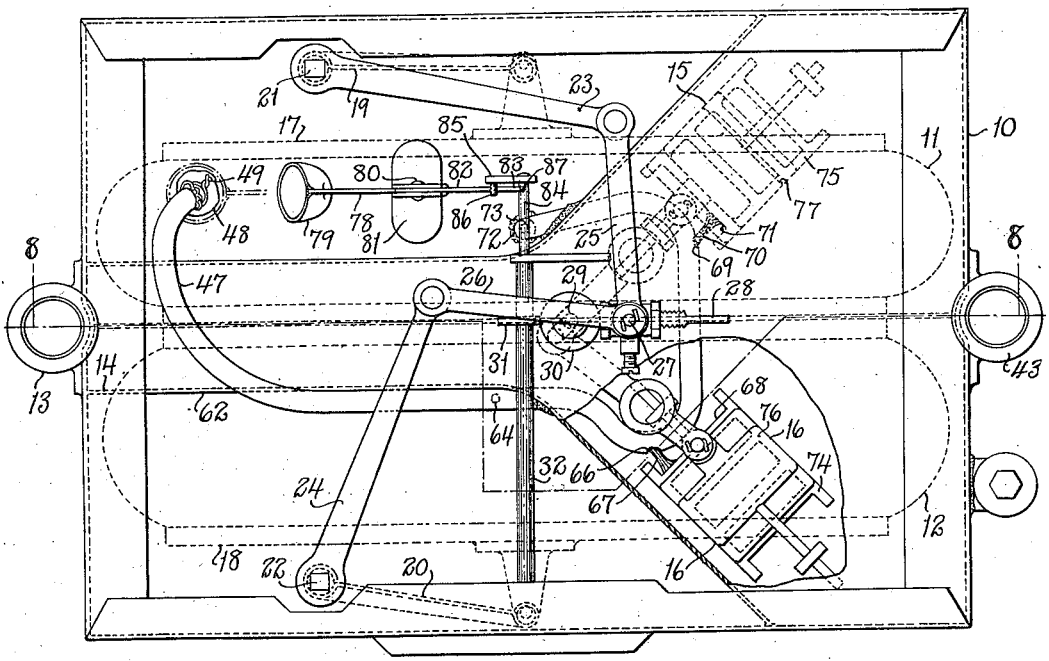
Fig. 7 is a plan view of the gas meter shown in Fig. 1, with a modified form of lubricating system applied thereto.
Figure 8:
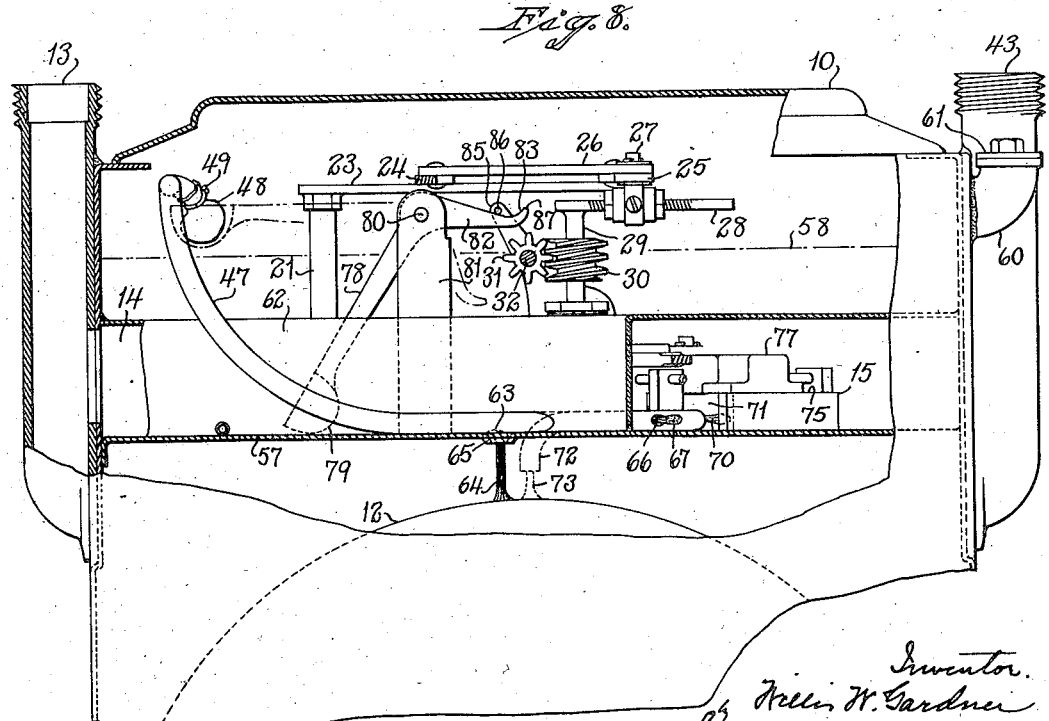
Fig. 8 is a sectional view on line 8—8 of Fig. 7.

Instead of supplying lubricant in the manner heretofore described, whereby the gas passing through the meter absorbs or becomes impregnated with the gas and re-deposits the lubricant upon the surfaces in the meter, I may apply lubricant in accordance with my invention in a different manner, such, for example, as illustrated in Figs. 7, 8 and 9. In this form of the invention, the porous fabric 48 is applied to the end of the tube 47 in the same manner as heretofore, but the tube 47 is directed in the manner indicated and may be secured by soldering or otherwise along the side 62 of the inlet and/or along the dividing-plate 57.

The tube 47 is provided with a hole 63 on its lower side, through which one wick-member 64 extends and passes downwardly through the aperture 65 in the dividing-plate 57 and extends downwardly into contact with the diaphragm 12. The tube 47 extends onward to a position adjacent the valve 16 where it is provided with an aperture 66 through which another wick-member 67 extends and engages against the upright end-wall 68 of the fixed portion of the valve 16. The tube 47 then extends across to a position adjacent the other valve 15, where it is provided with an aperture 69 through which another wick-member 70 emerges to have contact with the upright wall 71 of the valve 15. The tube 47 then is extended onward and has its end 72 passed downwardly through the dividing-plate 57, and out of the end 72 extends a wick-member 73 which extends into contact with the leather diaphragm 11. The portion of the tube 47 surrounding the aperture 63, and the end 72 of the tube where they pass through the dividing-plate 57, are made liquid-tight therewith by means of solder or otherwise, in order that the body of lubricant will not leak through the dividing-plate 57 otherwise than the way it is carried therethrough by the two wick-members 64 and 73.

It will be obvious that the manner of extending various wick-members and applying them to the parts illustrated in Figs. 7 and 8 may be accomplished in other ways than illustrated.

Lubricant passing down the wick-members 64 and 73 into contact with the diaphragms 12 and 11, will gradually creep therearound and lubricate the diaphragms satisfactorily. Lubricant extending along the wick-members 67 and 70 into contact with the upright walls 68 and 71 of the valves 16 and 15 will gradually creep along the various surface-portions of the lower fixed portions of the valves 16 and 15, including the horizontal bearing-surfaces 74 and 75, over which the upper movable portions 76 and 77 of the valves 16 and 15 respectively move during their operation, thereby additionally tending to spread the lubricant along between the relatively-moving surfaces of the movable and fixed portions of the valves 16 and 15, with the consequent proper lubrication of these relatively-moving surfaces and elimination and prevention of gum deposits therealong, thus retaining the valves in their proper working condition.

Lubricant will be intermittently supplied to the wick-members in the tube 47 in a manner similar to that heretofore described. A somewhat modified form of lubricant-holding supply-arm is shown, however, in Figs. 7, 8 and 9. In these figures, the arm 78 is shown with a cup 79 of just sufficient size to fit over the bulb-like formation including the ends of the wick-members covered by the fabric 48, although it will be understood that the cup 79 may be made of any other desired size or construction.

The arm 78, which is pivoted at 80 to the supporting-bracket 81, has its upper end 82 extending at an angle to the main portion of the arm and formed at its end with a curved portion 83, although, if desired, this may be left straight or otherwise formed. The shaft 32 has secured on its extended end 84 a crank-arm 85 carrying a crank-pin 86 which pin 86, as it rotates anti-clockwise, engages the end 82 to raise the arm 78 into oil-feeding position, as shown in Fig. 8.

When the pin 86 passes along the curved portion 83, it increases the speed of movement during the last portion of rise of the cup 79 into its uppermost oil-supplying position, after which, as the pin 86 passes beyond the end 87, the arm 78 and cup 79 are permitted to fall quickly to their lower positions, shown in Figs. 7 and 8, until the pin 86, in its next revolution, moves the cup 79 up again to its oil-supplying position, after which it again drops to its lowermost position.

It will be noted that in the form of the invention illustrated in Figs. 7 and 8, owing to the fact that the worm 30 and worm-gear 31 produce a relatively-slow rotation of the shaft 32 and pin 86, that the speed of reciprocation or oscillation of the arm 78 and its cup 79 will be very much slower than the speed of oscillation of the arm 52 shown in Figs. 1 and 2.

It will be evident that other constructions can be readily provided for obtaining any other desired speed of oscillation of the lubricant-holding supply-arm as may be desired, depending upon the kind of lubricant to be used and other conditions which may exist.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:

1. A gas meter including: gas-measuring mechanism; a supply of lubricant; wick-means adapted to cause lubricant to be carried to said gas-measuring mechanism, the lubricant-receiving end of said wick-means being freely exposed above and out of contact with said supply of lubricant; and lubricant-carrying means actuated by said gas-measuring mechanism and adapted to carry lubricant against said freely exposed end, excess lubricant being free to drop off said freely exposed end.

2. A gas meter including: gas-measuring mechanism; a supply of lubricant; wick-means adapted to cause lubricant to be carried to said gas-measuring mechanism, the lubricant-receiving end of said wick-means being freely exposed above and out of contact with said supply of lubricant; and a lubricant-carrying arm actuated by said gas-measuring mechanism and adapted to have one end of said arm carry lubricant against said freely exposed end, excess lubricant being free to drop off said freely exposed end.

3. A gas meter including: an inlet; gas-measuring mechanism; a supply of lubricant; wick-means adapted to impregnate with lubricant, gas passing along said inlet, the lubricant-receiving end of said wick-means being exposed above and out of contact with said supply of lubricant; and lubricant-carrying means actuated by said gas-measuring mechanism and adapted to carry lubricant against said exposed end, excess lubricant being free to drop off said exposed end.

4. A gas meter including: a casing; gas-measuring mechanism; a substantially-horizontal partition dividing said casing into upper and lower chambers; said partition and the walls of said upper chamber serving to hold a supply of lubricant; wick-means in said upper chamber and adapted to cause lubricant to be carried to said gas-measuring mechanism, the lubricant-receiving end of said wick-means being freely exposed above and out of contact with said supply of lubricant; and lubricant-carrying means actuated by said gas-measuring mechanism and adapted to carry lubricant against said freely exposed end, excess lubricant being free to drop off said freely exposed end.

5. A gas meter including: a casing; gas-measuring mechanism; a substantially-horizontal partition dividing said casing into upper and lower chambers; an inlet; said partition and the walls of said upper chamber serving to hold a supply of lubricant; wick-means in said upper chamber and adapted to impregnate with lubricant, gas passing along said inlet, the lubricant-receiving end of said wick-means being exposed above and out of contact with said supply of lubricant; and lubricant-carrying means actuated by said gas-measuring mechanism and adapted to carry lubricant against said exposed end, excess lubricant being free to drop off said exposed end.

WILLIS W. GARDNER.